US009358833B2

United States Patent
Gulli

(10) Patent No.: US 9,358,833 B2
(45) Date of Patent: Jun. 7, 2016

(54) DRIP ELEMENT SEALING DEVICE, IN PARTICULAR FOR ROLLING BEARINGS

(71) Applicant: Carmelo Gulli, Turin (IT)

(72) Inventor: Carmelo Gulli, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/506,583

(22) Filed: Oct. 3, 2014

(65) Prior Publication Data

US 2015/0098670 A1    Apr. 9, 2015

(30) Foreign Application Priority Data

Oct. 3, 2013   (IT) ............................... TO2013A0802

(51) Int. Cl.
| | |
|---|---|
| F16C 33/78 | (2006.01) |
| F16C 33/80 | (2006.01) |
| B60B 27/00 | (2006.01) |
| F16J 15/447 | (2006.01) |
| F16J 15/32 | (2016.01) |
| F16C 33/76 | (2006.01) |
| F16C 41/00 | (2006.01) |

(52) U.S. Cl.
CPC ............. *B60B 27/0073* (2013.01); *F16C 33/76* (2013.01); *F16C 33/782* (2013.01); *F16C 33/7883* (2013.01); *F16C 33/80* (2013.01); *F16J 15/3264* (2013.01); *F16J 15/4478* (2013.01); *F16C 33/768* (2013.01); *F16C 41/007* (2013.01); *F16C 2326/02* (2013.01)

(58) Field of Classification Search
CPC ............. F16C 33/7823; F16C 33/7876; F16C 33/7879; F16C 33/7883; F16C 33/80; F16C 33/805; F16J 15/16; F16J 15/32; F16J 15/3204; F16J 15/3232; F16J 15/3256
USPC ................................... 384/480, 448, 485, 486
See application file for complete search history.

(56) References Cited

U.S. PATENT DOCUMENTS

| | | | |
|---|---|---|---|
| 2006/0261803 A1* | 11/2006 | Faetanini ............ | B60B 27/0005 324/207.25 |
| 2007/0085276 A1* | 4/2007 | Hartmann ............ | F16J 15/3264 277/349 |
| 2011/0221140 A1* | 9/2011 | Nakagawa ............. | F16J 15/164 277/412 |

FOREIGN PATENT DOCUMENTS

DE        102008017409 A1 *  10/2009  ........... F16J 15/3264

* cited by examiner

*Primary Examiner* — Phillip A Johnson
(74) *Attorney, Agent, or Firm* — Bryan Peckjian; SKF USA Inc. Patent Dept.

(57) ABSTRACT

A sealing device including a first annular rotating shield, a second annular shield, fixed and arranged in front of the first shield for delimiting therebetween a first annular chamber and a sealing ring provided with at least a first and a second annular lips that extend axially and radially project from a flange portion of the second shield and towards a flange portion of the first shield, inside the annular chamber. At least one of the first and second lips cooperates with the flange portion of the first shield without touching it for defining a first dynamic labyrinth seal therewith. The first shield integrally supports a third annular lip that extends projecting from the first shield towards one of the first and second lips without touching it for defining a second dynamic labyrinth seal between the first and second shield and inside the annular chamber.

7 Claims, 1 Drawing Sheet

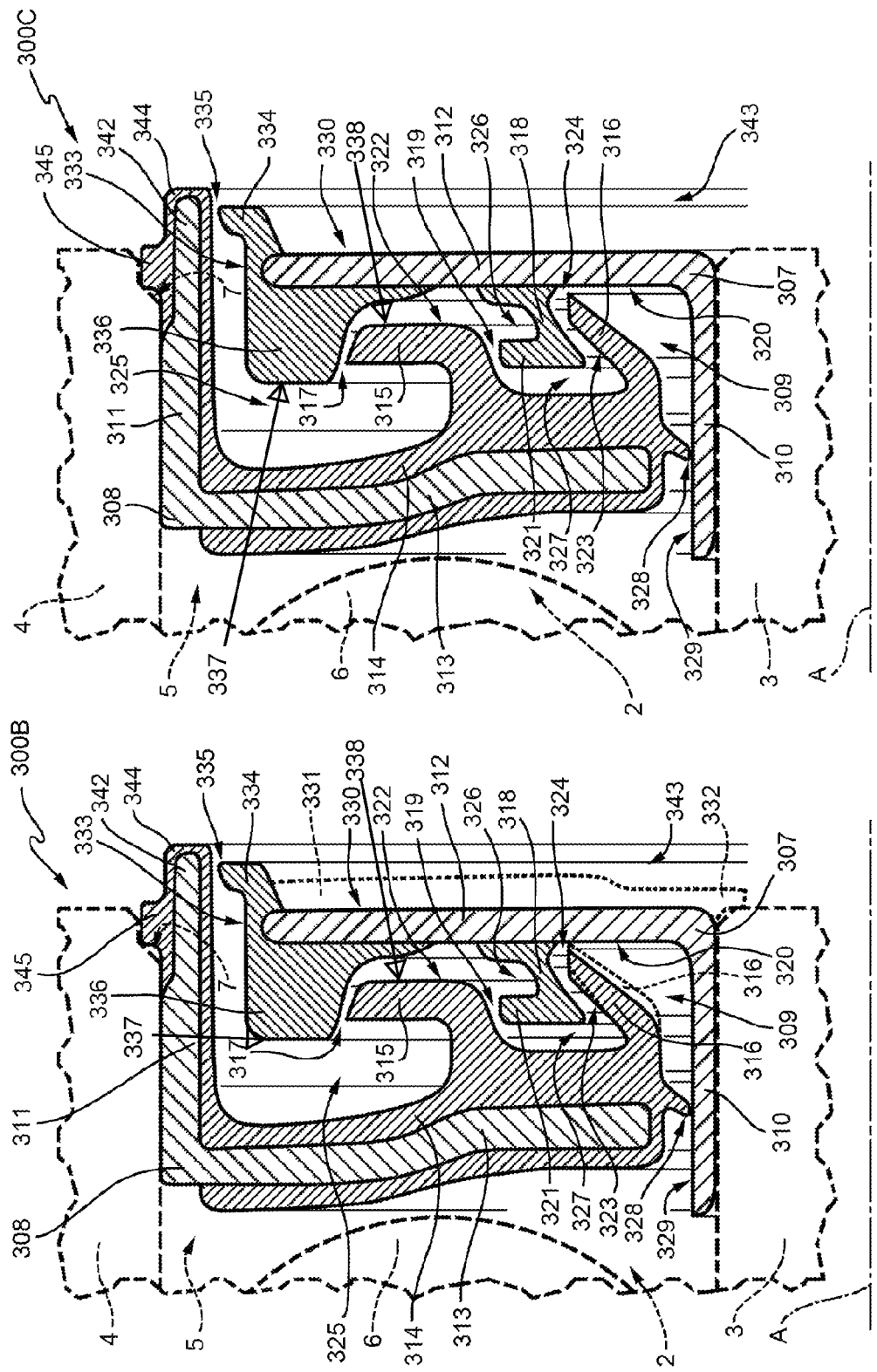

DRIP ELEMENT SEALING DEVICE, IN PARTICULAR FOR ROLLING BEARINGS

FIELD OF THE INVENTION

The present invention relates to a drip element sealing device, in particular for rolling bearings.

BACKGROUND OF THE INVENTION

The sealing assemblies intended to equip the rolling bearings of wheel hub assemblies are formed by so-called seals including a first and a second annular shield, mounted in front of each other so as to delimit an annular chamber between the shields, communicating towards the outside by means of an annular opening, and a series of sealing lips, which are arranged inside the annular chamber, substantially in sliding contact on respective sealing surfaces of the rotating shield, and are carried by a sealing ring integrally fixed to one of the shields, generally the shield intended in use to remain stationary. One sealing lip of these sealing lips, arranged closest to the annular opening, is generally shaped so as to define a drip element inside the annular chamber, i.e. an annular recess within which the contaminated fluids which may have entered into the annular chamber may be collected to be disposed later.

While they are satisfactory, the known sealing devices have relatively high frictions due to the sliding lips charged by springs or in any case mounted with strong interferences. Sealing assemblies including only labyrinth seals, in addition to being relatively large sized and articulated to be implemented, have low frictions with reduced sealing efficiencies, often not sufficient for several applications, such as in the automotive field. DE102008017409 does not solve the problem.

SUMMARY OF THE INVENTION

The object of the present invention is to provide a sealing device which is free from the above-described drawbacks, having low costs and high ease of manufacture, high protection efficiency of the rolling bodies, reduced axial and radial dimensions and above all, a reduced friction.

A drip sealing device for rolling bearings of wheel hub assemblies, adapted to be inserted between a first and a second member in relative rotation for fluid-sealingly insulating from an external environment an annular cavity defined between the first and second members, the sealing device having a symmetry axis (A) is provided.

A first annular shield in use angularly integrally constrainable to the first member by means of a respective sleeve portion for rotating with the first member about the symmetry axis (A) and defining an axially outer shield of the sealing assembly with respect to the annular cavity; a second annular shield in use angularly integrally constrainable to the second member, coaxial to the first shield, by means of a respective sleeve portion, and defining an axially inner shield of the sealing assembly with respect to the annular cavity; the second annular shield and the first annular shield defining between them an annular chamber delimited on opposite sides, in a radial direction, by the sleeve portions, and, in the axial direction, by respective flange portions of the first and second shields arranged reciprocally facing, the flange portion of the first shield delimiting the annular chamber towards the external environment (E); and a sealing ring integrally carried by the second annular shield and provided with at least a first and a second annular lip which extend axially and radially projecting from the flange portion of the second shield and towards the flange portion of the first shield, inside the annular chamber (309); wherein:

i) the first and second lips cooperate with the flange portion of the first shield without touching it, and define a first dynamic labyrinth seal with the flange portion of the first shield and inside the annular chamber;

ii) the first shield integrally supports a third annular lip which extends projecting from the first shield towards the first and the second lip without touching them, in a radially intermediate position between the first and the second lip, for defining a second dynamic labyrinth seal between the first and second shields and inside the annular chamber;

iii) the first, the second and the third annular lips define, in a radial direction, respective first, second and third annular drip elements arranged in succession in series in a radial direction and delimiting, inside the annular chamber, a plurality of respective cavities; the sealing assembly being characterized in that, in combination:

iv) the first lip is shaped in radial section as an upper case U, while the third lip shaped in radial section as a lower case U and the second lip is shaped in radial section as an asymmetric V;

v) a radially outer edge of the flange portion of the first shield, which is opposite to the sleeve portion, is shaped so as to define, towards the annular chamber and in use on an opposing side with respect to the external environment (E), a first axial annular projection axially delimited towards the second shield by an first annular surface transversal to the axis (A), which is arranged axially projecting towards the second shield with respect to the first lip so as to be arranged axially within the axial width of the recess constituting the first drip element;

vi) the first lip is axially delimited towards the first shield by a second annular surface transversal to the axis (A) and arranged axially projecting towards the first shield with respect to a free end edge of the third annular lip so as to be arranged axially within the axial width of the recess constituting the second drip element;

vii) the conformation and position of the third annular lip is such to arrange the free end edge thereof, which is I-shaped in radial section, axially within the recess constituting the third drip element.

BRIEF DESCRIPTION OF THE DRAWINGS

The invention will now be described with reference to the accompanying drawings which show a non-limiting embodiment thereof, in which:

FIG. 1 schematically shows a longitudinal elevation radial sectional view of a first embodiment of the sealing device according to the invention applied to a rolling bearing, shown only partially for simplicity;

FIG. 2 diagrammatically shows a radial sectional view of a possible variant of the device of FIG. 1.

DETAILED DESCRIPTION OF THE INVENTION

With reference to FIGS. 1 and 2, reference numeral 300 (FIG. 1) indicates a drip element sealing device, in particular designed to be mounted to a rolling bearing 2 of a wheel hub assembly, known and not shown as a whole for simplicity, for being inserted between a first member 3 and a second member 4 in relative rotation, in the example shown defined by the inner ring 3 and by the outer ring 4 of bearing 2, for fluid-sealingly insulating from an external environment, indicated with letter "E", an annular cavity 5 delimited between members 3 and 4 and accommodating, in the example shown, a plurality of rolling bodies 6 of bearing 2.

The sealing device 300 is implemented in FIG. 1 according to a first embodiment, indicated with reference numeral 300B, and in FIG. 2 with a second embodiment, indicated with reference numeral 300C.

Both sealing devices 300B and 300C, which hereinafter will be described together for common parts using the same reference numerals for simplicity, have a symmetry or rotation axis A and comprise a first annular shield 307 in use angularly integrally constrainable to the first member or inner ring 3 for rotating therewith and a second annular shield 308 in use angularly integrally constrainable to the second member or outer ring 4, coaxial to the first shield 307 and stationary with respect to shield 307, with which it defines an annular chamber 309.

The annular chamber 309 is delimited on opposite sides, in radial direction from respective sleeve portions 310,311, coaxial to each other, of the first shield 307 and of the second shield 308, by which shields 307,308 are constrained to members 3 and 4, respectively, in a known manner, for example by force fitting; and, in axial direction, by respective flange portions 312,313 of the first shield 307 and of the second shield 308, arranged reciprocally facing each other.

The sealing assemblies 300B and 300C further comprise a sealing ring 314 integrally carried by shield 308 and provided with at least a first annular lip 315 and a second annular lip 316 which extend axially and radially projecting from the flange portion 313 and towards the flange portion 312, inside the annular chamber 309.

According to a first aspect of the invention common to all the embodiments that will be described, as will be seen, at least one of lips 315 and 316, in both the non-limiting examples shown, cooperates/cooperate with the flange portion 312 of the first shield 307 without touching it but with a minimum axial clearance (in the order of the millimeter or less), which first shield is in use rotating about its symmetry axis A with respect to the second shield 308.

Therefore, lip 315 defines a first axially oriented dynamic labyrinth seal 317 with the flange portion 312 and inside the annular chamber 309; here and hereinafter, "dynamic" means that seal 317 is exerted between two members in relative motion and, in particular, that the moving member (rotating shield 307, in this case) is that facing in use towards the external environment E from which the contaminants, which try to penetrate cavity 5, come.

In combination with the foregoing, shield 307 integrally supports a third annular lip 318 which extends projecting from shield 307 towards one of lips 315,316 carried by the shield in use stationary 308 (in the non-limiting example shown towards lip 315) without touching it, for defining a second dynamic labyrinth seal 319 between shields 307 and 308 and inside the annular chamber 309.

The annular sealing lips 315,316 and 318, as well as the whole sealing ring 314, are elastically deformable as they are made of an elastomeric material. Vice versa, shields 307,308 are preferably made of metal, for example a sheared and bent/deep-drawn sheet, or wholly or partly of a synthetic molded plastic material, but in any case of a stiffer material than that used for lips 315,316 and 318.

The flange portion 312 of the rotating shield 307 is arranged in use so as to delimit the annular chamber 309 towards the external environment E, the shield 307 defining in use an axially outer shield of the sealing assembly 300B/C with respect to the annular cavity 5 defined between the first and the second members 3 and 4.

According to the embodiments shown in FIGS. 1 and 2, lips 315,316 are arranged in a sequence in radial direction inside the annular chamber 309, the second lip 316 being arranged radially closer to the rotation axis A of the first shield 307 with respect to the first lip 315. Moreover, both lips 315,316 cooperate closely, but without touching it, with the flange portion 312 of the first shield 307, for defining a sequence of labyrinths with such a flange portion 312, which labyrinths are interposed in series in radial direction between the sleeve portion 310 of shield 307 and the sleeve portion 311 of shield 308, the outermost of which is that defining the dynamic labyrinth seal 317.

The third annular lip 318 is carried by a first face 320 facing towards shield 308 of the flange portion 312, axially and radially projecting therefrom and extends inside the annular chamber 309 so as to be interposed in series, according to a radial direction, between the first lip 315 and the second lip 316. The third annular lip 318 has a free I-shaped end edge 321, oriented in radial direction and which faces towards the flange portion 313, to which it is arranged in parallel, in radial section in a position immediately beneath and close to lip 315, so as to define the second dynamic labyrinth seal 319 with an extrados portion 322 of the first lip 315 facing towards shield 307.

Moreover, lip 318 is shaped and arranged so as to define a third dynamic labyrinth seal 324 with an intrados portion 323 of lip 316 facing towards the second shield 308.

The lips 315, 316 and 318 are shaped in radial section as an upper case U the lip 315, as a lower case U the lip 318, and as an asymmetric V the lip 316, so as to define a sequence of annular drip elements 325, 326, 327 in radial direction (and towards axis A), arranged in series on top of each other and thereby delimit a plurality of recesses inside the annular chamber 309, which recesses constitute the drip elements 325, 326, 327 and are arranged in series in a sequence in radial direction, separate from one other by at least the dynamic labyrinth seals 319 and 324.

Finally, the sealing assemblies 300B and 300C comprise a fourth annular lip 328 integrally obtained with the sealing ring 314 and the related lips 315 and 316. Lip 328 extends projecting from the flange portion 313 on an opposing side with respect to lip 316 and in use, on an opposing side with respect to the external environment E and cooperates with slight interference with a radially outer lateral surface 329 of the sleeve portion 310, so as to define a sliding radial seal therewith. Lip 328 constitutes a so-called "grease guard" lip and is constantly lubricated with grease arranged in use inside cavity 5 towards the rolling bodies 6 and possibly, also inside chamber 309, between lip 316 and the sleeve portion 310.

In the sealing assembly 300B, the flange portion 312 of the rotating shield 307 (adapted to be mounted to the vehicle inner side of a wheel hub) supports, on a second face 330 thereof facing on an opposing side with respect to shield 308, an annular insert 331 (shown with a dashed line) made of an elastomer (such as ABS) which is at least partly magnetized, so as to define a known signal generating element or encoder for a known sensor, not shown for simplicity, of an ABS or anti-skid or ESP system of a vehicle. Insert 331 at least partly covers face 330 up to the sleeve portion 310 and has a first radial annular projection 332 which extends radially projecting from the sleeve portion 310 of the first shield 307 towards the rotation axis A and on the inside of the sleeve portion 310, and which annular projection 332 is shaped so as to define in use an axial stop shoulder for determining a fixed axial mounting position of the first shield 307 to member 3.

The radially outer edge 333, which is opposite to the sleeve portion 310, is defined by a block of plastic synthetic or elastomeric material integrally carried by the flange portion 312 and shaped so as to define, on an opposing side with respect to the annular chamber 309 and in use towards the external environment E, a first axial annular projection 334 which in radial section is shaped as an L facing towards the flange portion 311 and which axially extends projecting with respect to face 330 and in the immediate vicinity of the sleeve portion 311 for forming a labyrinth pre-seal 335 towards the exterior of the annular chamber 309.

Moreover, the radially outer edge 333 is shaped so as to define, towards the annular chamber 309 and in use on an opposing side with respect to the external environment E, a second axial annular projection 336 which axially extends projecting towards the second shield 308 with respect to face 320 of the flange portion 312 and inside the annular chamber 309, so defining said portion of edge 333 which defines the first dynamic labyrinth seal 317 with lip 315.

The axial annular projection 336 is axially delimited towards the shield 308 by an annular surface 337 transversal to axis A which is arranged axially projecting towards the shield 308 itself with respect to the lip 315 so as to be arranged axially within the axial width of the recess constituting the drip element 325. The position of the surface 337 with respect to the drip element 325 operates as drip guard and forces the impurities which may have entered into the annular chamber 309 to fall directly within the drip element and then to exit without concerning, or by only marginally concerning, the first dynamic labyrinth seal 317. Similarly, the first lip 315 is axially delimited towards the shield 307 by an annular surface 338 transversal to axis A which is arranged axially projecting towards the shield 307 itself with respect to a free end edge 321 of the third annular lip 318 to be arranged axially within the axial width of the recess constituting the drip element 326. The conformation and position of the third annular lip 318 is such to arrange the free end edge 321 thereof, I-shaped in radial section, axially within the axial width of the recess constituting the drip element 327 and further directly within the recess constituting the drip element 327.

The presence of exactly three drip elements 325, 326, and 327 and their interaction with both the lips radially above and the labyrinth seals allows to increase the sealing capacity of the drip element sealing device described and illustrated in variants 300B and 300C considerably. Each drip element 325, 326, and 327 is provided with a respective drip guard element which not only conveys the impurities which may have enter into the annular chamber 309 directly into the drip element 325, 326, and 327 itself, but also allows such elements to exit from the annular chamber 309 without concerning, or only marginally concerning, the respective dynamic labyrinth seals.

According to the further variant shown with a dashed line in FIG. 1, one of the two lips 315, 316 may be made as a sliding lip, but with reduced interference, in the example shown it is lip 316 which may be shaped as a more open V touching onto flange 312. This alternative solution may also be applied to the lip 316 of the drip element sealing device 300C in FIG. 2.

According to another aspect of the invention, in all the embodiments shown and described, the sleeve portion 311 of the second shield 308 extends axially projecting with respect to the flange portion 312 of the first shield 307 on the side opposite to the annular chamber 309, so as to define in use, with an annular end edge 342 thereof, opposite to the flange portion 313 of shield 308, a circular recess 343 arranged outside the annular cavity 5 and which surrounds the radially outer edge 333 of the flange portion 312 by the whole radial extension thereof; the annular edge 342 is wholly buried in an extension of the sealing ring 314 which forms an annular static sealing element 344 adapted to cooperate in use with the second member 4; the annular static sealing element is provided with a second radially outer radial annular projection 345 which is also shaped so as to define in use an axial stop shoulder for determining a fixed axial mounting position of the second shield 308 to the second member 4. To this end, the member or outer ring 4 is provided with an annular seat 7 inside which projection 345 is accommodated in use, in axial abutment.

The invention claimed is:

1. A drip element sealing device for rolling bearings of wheel hub assemblies, adapted to be inserted between a first member and a second member in relative rotation for fluid-sealingly insulating from an external environment an annular cavity defined between the first member and the second member, the sealing device having a symmetry axis (A) and comprising:

a first annular shield angularly integrally constrainable to the first member by a respective sleeve portion for rotating with the first member about the symmetry axis (A) and defining an axially outer shield of the sealing assembly with respect to the annular cavity;

a second annular shield angularly integrally constrainable to the second member, coaxial to the first shield, by means of a respective sleeve portion, and defining an axially inner shield of the sealing assembly with respect to the annular cavity; the second annular shield and the first annular shield defining between them an annular chamber delimited on opposite sides, in a radial direction, by the sleeve portions, and, in the axial direction, by respective flange portions of the first annular shield and second annular shield arranged reciprocally facing, the flange portion of the first annular shield delimiting the annular chamber towards the external environment (E); and a sealing ring integrally supported by the second annular shield and provided with at least a first annular lip and a second annular lip that extend axially and radially projecting from the flange portion of the second annular shield and towards the flange portion of the first annular shield, inside the annular chamber; wherein:

i) the first annular lip and the second annular lip cooperate with the flange portion of the first annular shield without touching the flange portion of the first annular shield, and define a first dynamic labyrinth seal with the flange portion of the first shield and inside the annular chamber;

ii) the first shield integrally supports a third annular lip that extends projecting from the first shield towards the first annular lip and the second annular lip without touching the first annular lip and the second annular lip, in a radially intermediate position between the first annular lip and the second annular lip, for defining a second dynamic labyrinth seal between the first shield and second shield and inside the annular chamber;

iii) the first annular lip, the second annular lip and the third annular lip define, in a radial direction, respective first annular drip element, the second annular drip element and the third annular drip element arranged in succession in series in a radial direction and delimiting, inside the annular chamber, a plurality of respective cavities; and wherein:

iv) the first annular lip is shaped in radial section as an upper case U, while the third annular lip shaped in radial section as a lower case U and the second annular lip is shaped in radial section as an asymmetric V;

v) a radially outer edge of the flange portion of the first shield, which is opposite to the sleeve portion, is shaped to define, towards the annular chamber and on an opposing side with respect to the external environment (E), a first axial annular projection axially delimited towards the second annular shield by a first annular surface transversal to the axis (A), which is arranged axially projecting towards the second annular shield with respect to the first annular lip to be arranged axially within the axial width of a recess constituting the first drip element;

vi) the first annular lip is axially delimited towards the first shield by a second annular surface transversal to the axis (A) and arranged axially projecting towards the first annular shield with respect to a free end edge of the third annular lip to be arranged axially within the axial width of a recess constituting the second drip element;

vii) the conformation and position of the third annular lip is such to arrange the free end edge thereof, which is I-shaped in radial section, axially within a recess constituting the third drip element.

2. The sealing device according to claim 1, wherein the annular drip elements are in a sequence in a radial direction inside the annular chamber; the first annular lip and the second annular lip cooperate very closely, but without the first annular lip and the second annular lip touching one another, with the flange portion of the first annular shield, and also with the third annular lip, for defining a sequence of labyrinths interposed in series in a radial direction between the sleeve portion of the first annular shield and the sleeve portion of the second annular shield.

3. The sealing device according to claim 2, wherein the third annular lip is carried in an axially and radially projecting manner by a first face of the flange portion of the first annular shield facing towards the second annular shield and extends inside the annular chamber to be interposed in series, according to a radial direction, between the first annular lip and the second annular lip.

4. The sealing device according to claim 3, wherein the first annular lip, the second annular lip and third annular lip define the annular drip elements in the radial direction, arranged in series in the radial direction, and separated from one other by at least the second dynamic labyrinth seal and a third dynamic labyrinth seal.

5. The sealing device according to claim 1, wherein the sealing ring further comprises a fourth annular lip that extends projecting from the flange portion of the second shield on an opposing side with respect to the second annular lip, to the external environment (E) to the annular cavity defined between the first member and the second member; the fourth annular lip cooperating with slight interference with a radially outer lateral surface of the sleeve portion of the first annular shield, to define a sliding radial seal therewith.

6. The sealing device according to claim 1, wherein the flange portion of the first shield supports, on a second face thereof facing towards an opposing side of the second shield, an annular insert made of an at least partly magnetized elastomer, to define a signal generating element, wherein the insert at least partly covers the second face up to the sleeve portion of the first annular shield and has a first radial annular projection that extends radially projecting from the sleeve portion of the first annular shield towards the rotation axis (A) of the first annular shield and on the inside of the sleeve portion of the first annular shield, which first radial annular projection is shaped to define in use an axial stop shoulder for determining a fixed axial mounting position of the first annular shield to the first member.

7. The sealing device according to claim 1, wherein the radially outer edge of the flange portion of the first annular shield, opposite to the sleeve portion of the first annular shield, is shaped to define, on an opposing side with respect to the annular chamber delimited between the first annular shield and the second annular shield, and towards the environment (E) external to the annular cavity delimited between the first member and the second member, a second axial annular projection that extends axially projecting with respect to a second face of the flange portion of the first annular shield facing on an opposing side of the second annular shield and in the immediate vicinity of the sleeve portion of the second annular shield for forming a first labyrinth pre-seal with the second annular shield towards the exterior of the annular chamber.

* * * * *